United States Patent
Lu et al.

(10) Patent No.: US 11,602,804 B2
(45) Date of Patent: Mar. 14, 2023

(54) MULTI-LASER CUTTING METHOD AND SYSTEM THEREOF

(71) Applicant: TOPAPEX ENVIRONMENT PROTECTION ENERGY CO., LTD, Taipei (TW)

(72) Inventors: Hung-Tu Lu, Taipei (TW); Alexander Naumov, Taipei (TW); Vladimir Kondratenko, Taipei (TW)

(73) Assignee: TOPAPEX ENVIRONMENT PROTECTION ENERGY CO., LTD, Taipei (TW)

( * ) Notice: Subject to any disclaimer, the term of this patent is extended or adjusted under 35 U.S.C. 154(b) by 351 days.

(21) Appl. No.: 16/861,846

(22) Filed: Apr. 29, 2020

(65) Prior Publication Data
US 2020/0353570 A1    Nov. 12, 2020

(30) Foreign Application Priority Data
May 7, 2019    (TW) ................................. 108115779

(51) Int. Cl.
| | |
|---|---|
| *B23K 26/38* | (2014.01) |
| *B23K 26/70* | (2014.01) |
| *B23K 26/04* | (2014.01) |
| *B23K 26/064* | (2014.01) |
| *B23K 26/0622* | (2014.01) |

(52) U.S. Cl.
CPC ............ *B23K 26/38* (2013.01); *B23K 26/043* (2013.01); *B23K 26/064* (2015.10); *B23K 26/0622* (2015.10); *B23K 26/703* (2015.10)

(58) Field of Classification Search
CPC .. B23K 26/38; B23K 26/043; B23K 26/0622; B23K 26/064; B23K 26/703
See application file for complete search history.

(56) References Cited

U.S. PATENT DOCUMENTS

| | | | | |
|---|---|---|---|---|
| 2007/0275338 | A1* | 11/2007 | Acker | ................... C03B 33/091 |
| | | | | 432/9 |
| 2011/0298156 | A1* | 12/2011 | Hooper | .............. B23K 26/0622 |
| | | | | 264/400 |
| 2012/0205356 | A1* | 8/2012 | Pluss | .................. B23K 26/0884 |
| | | | | 219/121.72 |

FOREIGN PATENT DOCUMENTS

WO    WO-2013084879 A1 *    6/2013    ............. B23K 26/40

* cited by examiner

*Primary Examiner* — Daniel McNally
(74) *Attorney, Agent, or Firm* — Li & Cai Intellectual Property (USA) Office

(57) ABSTRACT

The present invention discloses that a multi-laser cutting method and system, which is applied to a substrate to form a primary substrate having a pattern of rounded corners and a line, the throughput could be improved because $CO_2$ laser cannot cut the round corner at the high speed, but the substrate strength could be kept due to the high cutting quality of the lines by $CO_2$ laser. The poor quality of the cutting edges of the round corners will not affect on the substrate strength but the round corner cutting by the second laser unit will speed up the cutting process. The present invention applies the method by the 2 different laser machines to balance the throughput. Because at the same speed, for example 150 mm/sec, the cycle time per 1 substrate will be different due to the different length of the cutting lines.

9 Claims, 2 Drawing Sheets

MULTI-LASER CUTTING METHOD AND SYSTEM THEREOF

FIELD OF THE INVENTION

The present invention relates to substrate processing, particularly, to a multi-laser cutting method which selects different laser beams based on different patterns and the system thereof.

BACKGROUND OF THE INVENTION

Laser is used to process (e.g., cutting, boring) conventional substrates (e.g., glass, sapphire, silicon, gallium arsenide, ceramics) to obtain corresponding shapes and holes in order to achieve satisfactory processing quality.

Conventional laser processing requires the use of water. The gushing method can decrease the temperature of the substrate due to laser processing and clean scrap. Without water as an agent, it would be difficult to achieve good yield and efficacy in substrate processing.

Therefore, the present invention provides a multi-laser cutting method and a system thereof capable of overcoming the aforementioned shortcomings.

SUMMARY OF THE INVENTION

The first objective of the present invention is to provide a multi-laser cutting method applied to a substrate to form a secondary substrate having a pattern (or shape) of a round corners and a lines, and to characterize the post-cutting secondary substrate with high cutting quality of the line edge, high bending resistance of 4 point bending strength tests, and impact resistance, etc. by selecting different laser beams according to different patterns.

The second objective of the present invention is to provide said multi-laser cutting method, where if the pattern is determined to be a line, a first laser beam is selected and moved along a line trajectory to heat up a portion of the substrate and cut out the line after cooling.

The third objective of the present invention is to provide said multi-laser cutting method, wherein if the pattern is determined to be a round corner, a second laser beam is selected and moved along a round corner trajectory to perform cutting on a portion of the substrate to form a round corner.

The fourth objective of the present invention is to provide said multi-laser cutting method applied to a substrate to form a secondary substrate having a pattern of a round corner and a line.

In order to achieve the aforesaid objectives among others, the present invention provides a multi-laser cutting method which is applied to a substrate to form a secondary substrate having a pattern of a round corner and a line, said multi-laser cutting method comprising a step S1 of providing a first laser beam and a second laser beam; a step S2 of executing an application program to determine that if the pattern is a line, then select the first laser beam to heat up a portion of the substrate, cut out the line and cooling; a step S3 of executing the application to determine that if the pattern is a round corner, then select a second laser beam to perform cutting on a portion of the substrate to form a round corner; a step S4 of repeatedly performing steps S2 and S3 until the application process has determined all of the patterns forming on the secondary substrate; and a step S5 of obtaining a secondary substrate from the substrate.

In order to achieve the aforesaid objectives among others, the present invention provides a multi-laser cutting system which is applied to a substrate to form a secondary substrate having a pattern of a round corner and a line, said multi-laser comprising a load unit, a first laser unit, a cooling unit, a second laser unit, a driver module and a processing unit. The load unit is for disposing a substrate thereon; the first laser unit is disposed on one side of the load unit, outputting a first laser beam according to a control instruction; the cooling unit is disposed on the first laser unit (the cooling unit "waterjet" (for example the same application number TW107216639) is disposed therefore to spray the air-water mixture spot right after the focused laser spot of the first laser unit beam) (regarding FIG. 2 the cooling unit 16 should be disposed nearly the substrate surface at about 3-10 mm height), outputting a substance according to a control instruction; the second laser unit is disposed on one side of the load unit, outputting a second laser beam according to a control instruction; the driver module is connected to the first laser unit, the cooling unit and the second laser unit, driving the first laser unit, the cooling unit and the second laser unit according to a move instruction; and the processing unit is connected to the first laser unit, the cooling unit, the second laser unit and the driver unit, generating control instructions according to a pattern data related to a pattern to operate the first laser beam to cut out a line and the second laser beam to cut out a round corner, forming a secondary substrate having a round corner and a line, wherein the processing unit generates control instructions to operate to the cooling unit to output substance to cool off a thermal energy generated from cutting out the line by the first laser beam.

Compared to prior art, the multi-laser cutting method and system thereof disclosed in the present invention utilizes at least two laser processing methods to perform cutting on a substrate. The present invention utilizes a first laser beam in combination with cooling to perform straight line laser cutting and utilizes a second laser beam to perform round corner laser cutting.

DETAILED DESCRIPTION OF THE PREFERRED EMBODIMENTS

In order to fully understand the objectives, features, and functions of the present invention, the present invention is described in detail as follows by the following specific embodiments along with the accompanying figures.

In the present invention, "a" or "one" is used to describe the units, elements, and components described herein. This is done for the convenience of description only and provides a general meaning to the scope of the present invention. Therefore, unless stated otherwise, this description should be understood to include one, at least one, and more than one.

The context of the present invention are as follows. The terms "comprising", "including", "having" or "containing" are intended to encompass non-exclusive inclusions. For example, a component, structure, article, or device that comprises a plurality of elements is not limited to the elements listed herein but may include those not specifically listed but which are typically inherent in the element, structure, article, or device. Other requirements. In addition, the term "or" means an inclusive "or" unless it is specifically stated otherwise, rather than an exclusive "or".

Figure 1:
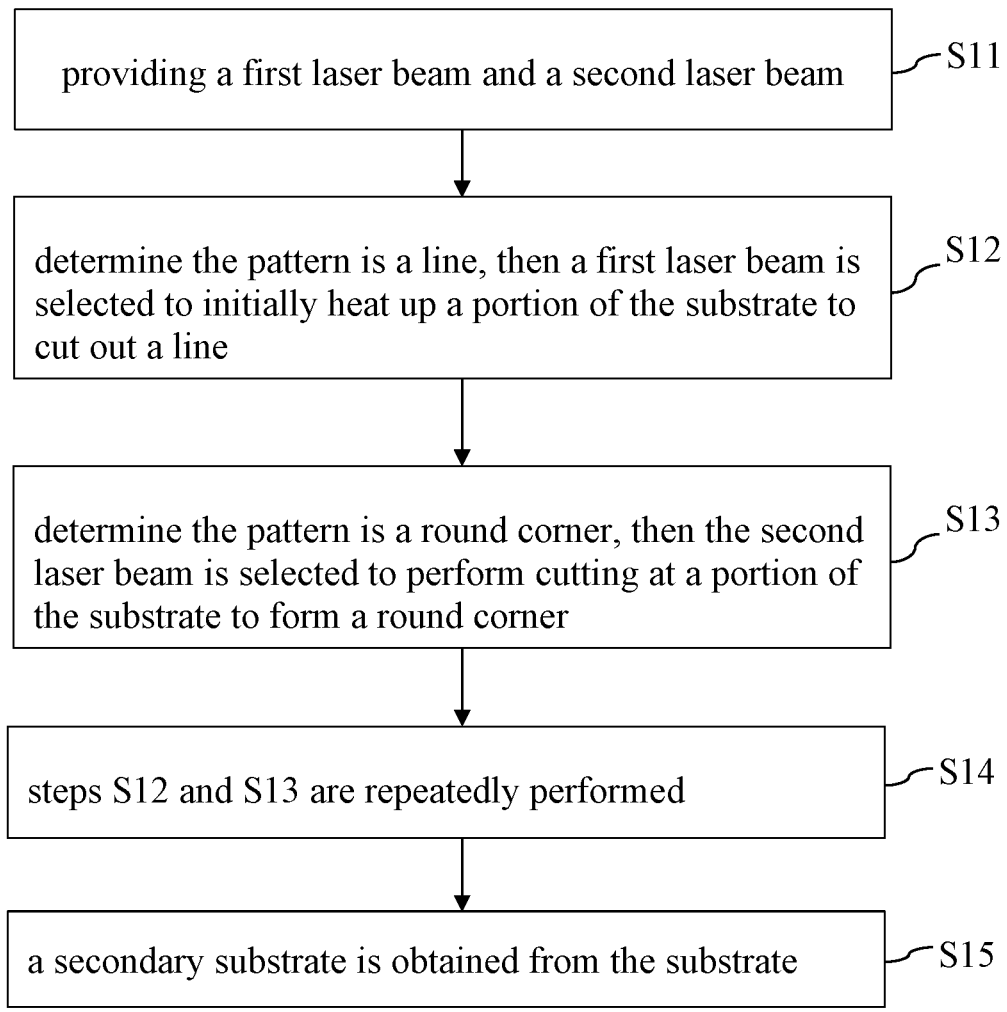
FIG. 1 is the flow chart of a first embodiment of the multi-laser cutting method of the present invention.
Figure 2:
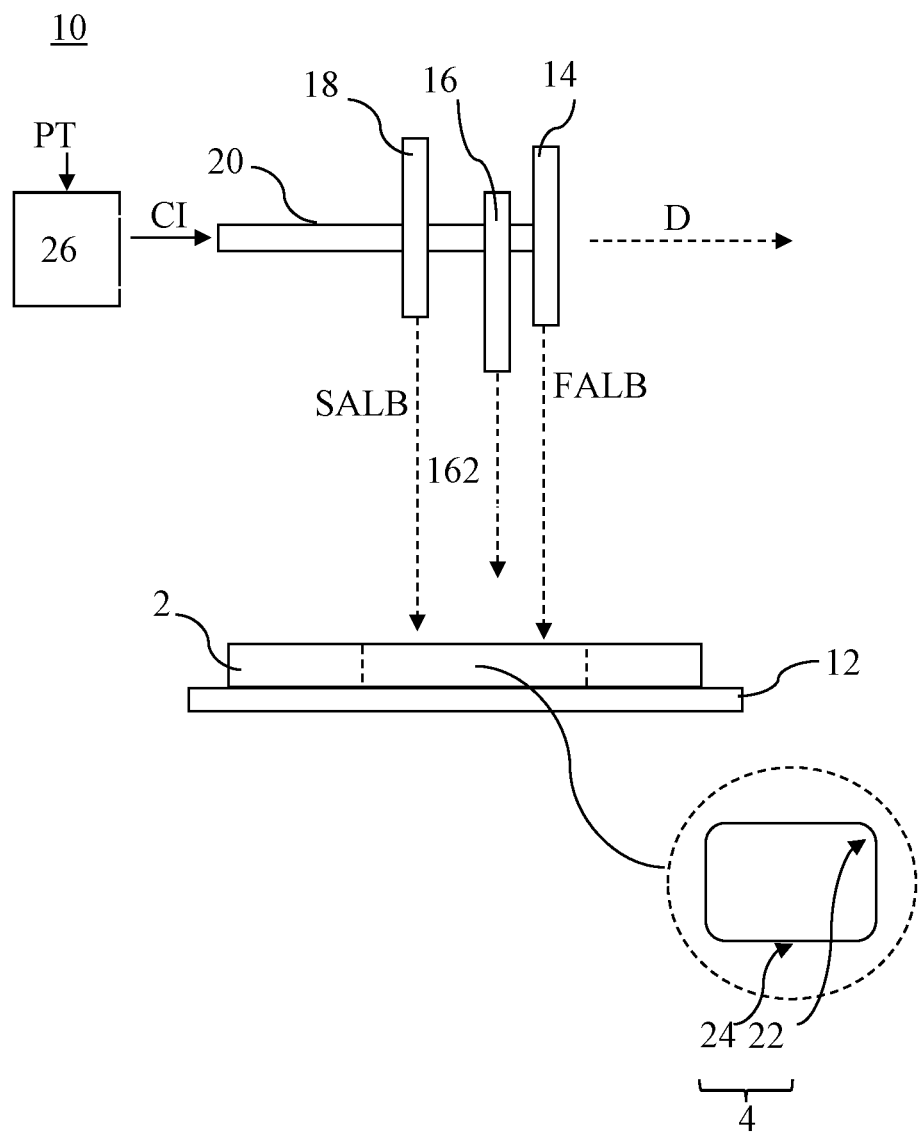
FIG. 2 is the block diagram of a second embodiment of the multi-laser cutting system of the present invention.

Please refer to FIG. 1, where it is a flow chart of a first embodiment of the multi-laser cutting method. In FIG. 1, a multi-laser cutting method is applied to a substrate made of, for example, glass, sapphire, silicon, gallium arsenide, ceramics, etc. The shape of the unprocessed substrate is not limited to rectangular and square having right angles, and the multi-laser cutting method is capable of forming a secondary substrate 4 having a round corner and a line, as shown in FIG. 2. The multi-laser cutting methods begins at step S11, providing a first laser beam and a second laser beam.

At step S12, an application process is executed and if the pattern is determined to be a line, a first laser beam is selected to initially heat up a portion of the substrate to cut out a line after subsequent cooling of the same portion. The cutting line is created at the heat/cool border between the first laser beam and cooling.

In this step, the application process may also turn on or off the first laser beam, output the luminous intensity of the first laser beam and drive the first laser beam to move along a line trajectory, where the line trajectory of the later may receive relevant substrate parameters (e.g. initial and end coordinates and angles of the line and round corner) through the application process; alternatively, the application process may receive patterns (or a file containing patterns) of the substrate and scan or recognize patterns to determine the size, shapes, etc. Moreover, the application process may set to trigger the first laser beam to perform substrate processing when the pattern is a line.

Furthermore, besides utilizing the first laser beam, this step preforms cooling at the heated portion of the substrate by means of using a cooling substance (e.g. water, coolant, air-liquid mixture) to reduce (or decrease) the temperature at the portion to create the sharp temperature gradient.

At step S13, the application process is executed to determine that if the pattern is a round corner, then the second laser beam is selected to perform cutting at a portion of the substrate to form a round corner. The application process may set to trigger to the second laser beam to perform substrate processing when the pattern is a round corner.

In this step, the application process may turn on or off the second laser beam, output a luminous intensity of the second laser beam and drive the second laser beam to move along a round corner trajectory or move the substrate accordingly the trajectory, where the round corner trajectory can be generated by using the same method as for the aforesaid line trajectory, so the description of such is omitted herein.

Carbon dioxide laser, picosecond laser or femtosecond laser may be respectively adopted as the first laser beam and the second laser beam. In addition, both the first laser beam and the second laser beam may be driven to change the relevant physical characteristics of the laser such as a path, a direction, a power, a focus, a beam diameter, a focal length etc., in order to accommodate different cutting and processing requirements.

Furthermore, in pursuance of an application process, the first laser beam and/or the second laser beam may be driven in at least one of a continuous wave (cw) mode, a single pulse mode, a pulse mode and a burst mode.

At step S14, steps S12 and S13 are repeatedly performed until the application has determined all of the patterns forming on the secondary substrate. In other words, at this step, the application process has driven the first laser beam and the second laser beam to cut out substrates having lines and round corners.

In another embodiment, at the junction of the line and the round corner, the application may further determine whether the pattern has a line to round corner or round corner to line transition and select the first laser beam or the second laser beam to perform cutting accordingly.

At step S15, a secondary substrate is obtained from the substrate.

Please refer to FIG. 2, where it is a block diagram of a second embodiment of the multi-laser cutting system. In FIG. 2, the multi-laser cutting system 10 is applied to a substrate 2 to form a secondary substrate 4 having a round corner 22 and a line 24.

The multi-laser cutting system 10 comprises a load unit 12, a first laser unit 14, a cooling unit 16, a second laser unit 18, a driver module 20 and a processing unit 26.

The load unit 12 is used for disposing the substrate 2 thereon.

The first laser unit 14 is disposed on one side of the load unit 12, outputting a first laser beam (FALB) according to a control instruction (CI), where the first laser unit 14, for example, is a carbon dioxide laser ($CO_2$ laser).

The cooling unit 16 is disposed near? the first laser unit 14, outputting a substance 162 (e.g. water, coolant, gas, air-liquid mixture, liquid, etc.) according to a CI.

The second laser unit 18 is disposed on one side of the load unit 12, outputting a second laser beam (SALB) according to a CI, where the second laser unit 18, for example, is a pico-second laser.

The driver module 20 is connected to the first laser unit 14, the cooling unit 16 and the second laser unit 18, driving the first laser unit 14, the cooling unit 16 and the second laser unit 18 to move towards a direction D according to a move instruction.

The processing unit 26 is connected to the first laser unit 14, the cooling unit 16, the second laser unit 18 and the driver unit 20, generating CI according to a pattern data (PTD) related to a pattern to operate the first laser beam FALB to cut out a line 24 and the second laser beam SALB to cut out a round corner 22, forming a secondary substrate 4 having a round corner 22 and a line 24.

Furthermore, the processing unit 26 generates CI to operate to the cooling unit 16 to output substance 162 to cool off a thermal energy generated from cutting out the line 24 by the first laser beam FALB. Wherein, the processing unit 26 is capable of adjusting a physical characteristic of the first laser beam FALB and the second laser beam SALB, for example, such physical characteristic may be at least one of a power, beam density, scan speed and duration, or the processing unit 26 is capable of operating the first laser beam FALB and the second laser beam SALB in at least one of a continuous wave (CW) mode, a single pulse mode, a pulse mode and a burst mode.

In yet another embodiment, the first laser unit 14 or the second laser unit 18 further include an optical component (not shown in drawing) to adjust at least one of the paths, a direction, a power, a focus, a beam diameter and a focal length of the laser beam.

The present invention is disclosed in the abovementioned description by several preferred embodiments, but it is supposed to be comprehended by those who are skilled in the art that the embodiments are used only to illustrate the present invention rather than restrict the scope of the present invention. It should be noted that any equivalent variance or replacement in the embodiments shall be covered by the scope of the present invention. Therefore, what is claimed in the present invention shall be subject to the claims.

What is claimed is:

1. A multi-laser cutting method applied to a substrate to form a secondary substrate having a pattern of a round corner and a line, the multi-laser cutting method comprising:
   S1: providing a first laser beam and a second laser beam;
   S2: executing an application program to determine that if the pattern is the line, then select the first laser beam heat up a portion of the substrate, cut out the line and cooling;
   S3: executing an application process to determine that if the pattern is the round corner, then select a second laser beam to perform cutting on a portion of the substrate to form the round corner; wherein the step S2 or S3 further includes the application process determining whether the pattern has a line to round corner transition or a round corner to line transition at a junction of the line and the round corner, then selecting the first laser beam or the second laser beam to perform cutting;
   S4: repeatedly performing steps S2 and S3 until the application process has determined all of the patterns forming on the secondary substrate; and
   S5: obtaining the secondary substrate from the substrate.

2. The multi-laser cutting method according to claim 1, wherein step S2 further comprises the application process at least one of turning on or off the first laser beam, outputting the luminous intensity of the first laser beam and driving the first laser beam to move along a line trajectory.

3. The multi-laser cutting method according to claim 1, wherein step S2 further comprises using a cooling substance to decrease the temperature at the portion to create a sharp temperature gradient.

4. The multi-laser cutting method according to claim 1, wherein step S3 further comprises the application process at least one of turning on or off the second laser beam, outputting a luminous intensity of the second laser beam and driving the second laser beam to move along a round corner trajectory or move the substrate accordingly the trajectory.

5. A multi-laser cutting system applied to a substrate to form a secondary substrate having a pattern of a round corner and a line, said multi-laser comprising:
   a load unit for disposing a substrate thereon;
   a first laser unit disposed on one side of the load unit, the first laser unit outputting a first laser beam according to a control instruction;
   a cooling unit disposed on the first laser unit, the cooling unit outputting a substance according to the control instruction;
   a second laser unit disposed on one side of the load unit, the second laser unit outputting a second laser beam according to the control instruction;
   a driver module connected to the first laser unit, the cooling unit and the second laser unit, the driver module driving the first laser unit, the cooling unit and the second laser unit according to a move instruction; and
   a processing unit connected to the first laser unit, the cooling unit, the second laser unit and the driver unit, the processing unit generating the control instruction according to a pattern data related to the pattern to operate the first laser beam to cut out the line and the second laser beam to cut out the round corner, forming a secondary substrate having the round corner and the line, wherein the processing unit generates the control instruction to operate to the cooling unit to output the substance to cool off a thermal energy generated from cutting out the line by the first laser beam; wherein an application process is executed to determine whether the pattern has a line to round corner transition or a round corner to line transition at a junction of the line and the round corner and select the first laser beam or the second laser beam to perform cutting.

6. The multi-laser cutting system according to claim 5, wherein the first laser unit is a carbon dioxide laser ($CO_2$ laser) and the second laser unit is a pico-second laser.

7. The multi-laser cutting system according to claim 5, wherein the substance is a liquid, air-liquid mixture or a gas.

8. The multi-laser cutting system according to claim 5, wherein the processing unit adjusts a physical characteristic of the first laser beam and the second laser beam, the physical characteristic being at least one of a power, beam density, scan speed and duration, or the processing unit operates the first laser beam and the second laser beam in at least one of a continuous wave (CW) mode, a single pulse mode, a pulse mode and a burst mode.

9. The multi-laser cutting system according to claim 5, wherein the first laser unit or the second laser unit further comprises an optical component to adjust at least one of the paths, a direction, a power, a focus, a beam diameter and a focal length of the laser beam.

* * * * *